L. F. DOUGLASS.
CINEMATOGRAPHY.
APPLICATION FILED DEC. 5, 1916.
1,313,587. Patented Aug. 19, 1919.
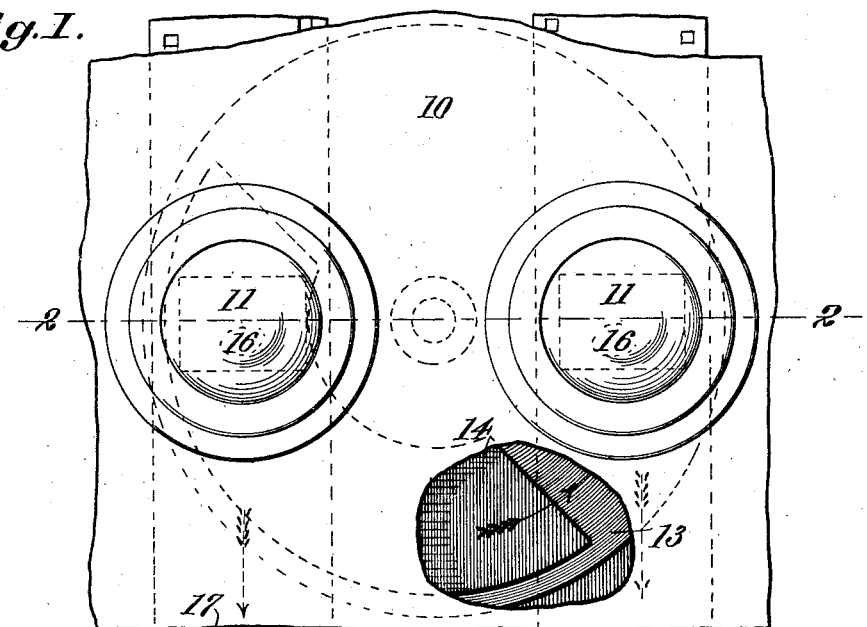
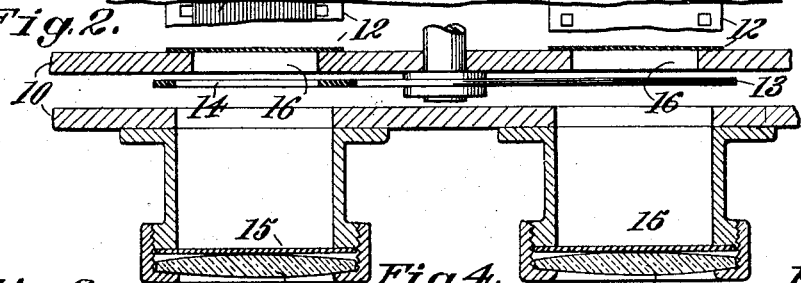
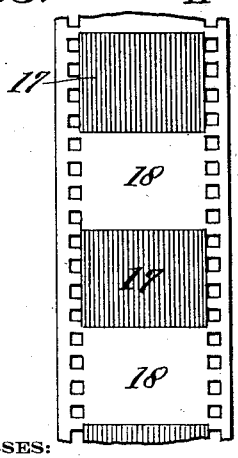
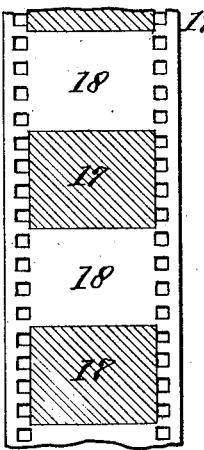
WITNESSES:
Charles Pickles
Frances V. Cole
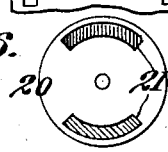
INVENTOR
Leon F. Douglass,
BY Strong & Townsend,
ATTORNEYS

UNITED STATES PATENT OFFICE.

LEON F. DOUGLASS, OF SAN RAFAEL, CALIFORNIA.

CINEMATOGRAPHY.

1,313,587.     Specification of Letters Patent.     Patented Aug. 19, 1919.

Application filed December 5, 1916. Serial No. 135,157.

*To all whom it may concern:*

Be it known that I, LEON F. DOUGLASS, a citizen of the United States, residing at San Rafael, in the county of Marin and State of California, have invented new and useful Improvements in Cinematography, of which the following is a specification.

This invention relates to cinematography; and has for its object to produce color and stereoscopic effects in motion pictures in an improved and simplified manner.

In carrying out this object, I expose two or more negative films, each through its own lens, provided with an individual color screen, the one screen being complementary to the other and adapted to record complementary color effects upon the opposite film; also to operate and expose said films alternately so that each film has alternate pictures and intermediate blank spaces thereon, the blank spaces on one film matching the exposed portions of the other, and thereafter print the positive film from the two negatives in black and white; the blank spaces on one negative matching the exposed portions of the other negative, so that the pictures or images from the two negatives appear in succession on the positive, adjacent images having different color values and different perspectives, and then project said positive film through a single projector with the aid of a shutter having opposite windows, in complementary colors, thus giving the natural color effect upon the screen. By taking two or more negatives with a camera having two spaced lenses each film through a differently positioned lens, a binocular or stereoscopic effect is given to the picture; also one film may be exposed while the other is being advanced, thereby permitting the pictures to be taken with greater rapidity, and allowing more time for exposure.

In the accompanying drawings:

Figure 1 shows a portion of a camera suitable for carrying out my invention.

Fig. 2 shows a sectional view of the same, taken on line 2—2 of Fig. 1.

Figs. 3 and 4 each show a portion of a negative film formed with alternate images and intermediate blank spaces, the images on said films recording complementary color effects of substantially the same scene.

Fig. 5 shows a portion of a positive film printed from both of said negatives, with the images on the latter appearing in succession thereon.

Fig. 6 shows a plan view of the shutter used in projecting the positive film.

In the drawings, I show a portion of a camera 10, equipped with two suitably spaced lenses 11, each adapted to project an image on its own respective negative film 12; the films being operated by appropriate feeding mechanism, not shown. A rotary shutter 13 is arranged behind both lenses, with a cut-away or light portion 14 adapted to uncover the films alternately. Complementary color screens 15—15', which, for example, may be described as being red and green respectively, are arranged over the apertures 16 in front of the films. The mechanism of the camera is such that as the film behind one screen is stationary and being exposed, the other one is being advanced, the light being cut off therefrom by the shutter. One film will be moved the distance of two picture spaces while the other one is being exposed, and thereafter the exposed negative will have alternate images 17 and intermediate blank spaces 18. Thus there will be an appreciable period of exposure of one film when the other film is not being exposed.

One exposed negative, as shown in Fig. 3, will have its images recording the red effects in the picture and the other exposed negative, as shown in Fig. 4, will have its images recording the green effects in the picture. A single positive film 19, as shown in Fig. 5, is printed from both negatives in such a way that the images on said negatives appear in succession upon the positive film. This is accomplished by fitting the negative films, one over the other, with the images of one registering with the blank spaces of the other.

The positive film is projected in the usual way through a single objective, but the shutter 20 of the projecting machine will be equipped with opposite windows 21 in complementary colors, one green and the other red for the example above given. The movement of the shutter 20 is so timed that when the portion of the film representing the red exposure is presented to the aperture in the projecting machine, the red window of the shutter will be in front thereof, and when the image on the film representing the green exposure is presented, the projection will be through the green window of the shutter. That is, all the pictures taken through a red screen are exposed through a red screen, and vice versa, all pictures taken through a green screen are exposed through the green screen. Thus the pictures projected upon the screen are alternately red and green, but by reason of the fact that they appear with such rapidity there will be a blending of the colors so that the natural color effects of the original scene will be reproduced. When the stereoscopic effect only is desired the red and green colored screen 15 is left out of the camera.

For the same reason the alternate pictures which were originally taken from slightly different positions, with the camera, owing to the spaced lenses 11, will blend upon the screen in a manner to give a stereoscopic effect after the principle of binocular vision.

Where sixteen pictures per second are taken in the ordinary way the period of $\frac{1}{16}$ of a second is divided into two parts, one for exposure and one for advancing the film so that each exposure is really only $\frac{1}{32}$ of a second in duration. During the latter step no exposure of the film can occur. However, in the present case there is no appreciable period of time during which one or the other films is not exposed, for the reason that the advancing of one film takes place while the other film is being exposed. I, therefore, obtain a more rapid operation with a prolonged exposure and the benefit of more light in photographing; the exposure being increased four times over the ordinary methods in vogue.

The positive film printed from two negatives in the manner above indicated may be projected in black and white with the ordinary shutter, and by so doing the natural colors will not be shown but a stereoscopic effect will be produced.

Various changes relating to the steps and apparatus employed may be made without departing from the spirit or principle of the invention.

Having thus described my invention, what I claim and desire to secure by Letters Patent is—

1. In cinematography, the method of producing a positive film for moving picture machines which consists in making two or more negatives having substantially the same series of images, one through a red filter and the other through a green filter with blank spaces between images and then printing these negatives on a single positive so that the latter has consecutive images as in a regular moving picture film, except that adjacent images are derived from different negatives and have different color values.

2. In cinematography, the exposing of two or more negative films to substantially the same scene, each through its own lens and in a manner to record complementary color effects on opposite films, feeding said films in such a manner that blank spaces occur between the images, one of said films being advanced while the other is being exposed so as to permit of a lengthened period of exposure, and printing both negative films upon a positive film with the images of one registering with the blank spaces of the other, so that the positive film will have consecutive pictures as in standard practice, and projecting said positive film with appropriate color effects.

3. In cinematography, the exposing of two or more negative films to substantially the same scene, each through its own lens, equipped with a distinctive color screen, opposite screens being of complementary colors, feeding said films in such a way that blank spaces occur between the images, one of said films being advanced while the other is being exposed so as to permit of a lengthened period of exposure, printing both negative films upon a single positive film with the images of one registering with the blank spaces of the other so that the positive film will have consecutive pictures of different color values, and projecting said positive film with the aid of a rotary shutter equipped with opposite windows of complementary colors for transmitting the appropriate color to the projected pictures, whereby alternate pictures appear upon the screen in different colors and blend to produce natural color effects.

4. In a motion picture camera, a pair of laterally spaced lenses each equipped with an individual color screen, said screen being of complementary colors, a film and film feeding mechanism for each, and a rotary shutter for both lenses operable to alternately expose said films, said feeding mechanism being operable to advance the covered film two spaces while the uncovered film is being exposed.

5. The art of producing moving pictures in color, which includes the following steps: first, the exposure of two negatives in a single camera through a pair of binocular lenses, the exposures on one negative alternating with the exposure on the other negative, the exposed portions of one negative being spaced apart and the intervening spaces on that negative matching the exposed portions of the other negative, the exposures on one negative being made through a green screen and the exposures on the other negative being made through a red screen, secondly, bringing the two negative films together so that the exposed portions of one film overlie the blank spaces on the other film, third, printing a positive from the combined negatives, and finally exposing the positive by a single lens projecting machine employing a shutter having a red window and a green window and operating the shutter coördinately with the positive film so that the red window of the shutter will successively mask those portions of the positive film corresponding to the image taken through the red screen and the green window in the shutter will successively mask the portions taken through the green screen.

6. The method of producing a positive film for colored moving pictures, which comprises making two or more negatives having slightly different series of images with blank spaces between the images, the images on one negative having a color value complementary to the images on the other and the images on one negative out of registry with the images on the other, matching the blank spaces of one negative with the images on the other, and then printing a positive from the two combined negatives so that the images on the positive will follow consecutively.

In testimony whereof I have hereunto set my hand in the presence of two subscribing witnesses.

LEON F. DOUGLASS.

Witnesses:
  Thos. P. Boyd,
  Eva A. Lyon.